US010983810B2

(12) United States Patent
Banerjee et al.

(10) Patent No.: US 10,983,810 B2
(45) Date of Patent: Apr. 20, 2021

(54) IMPLEMENTING WEB BROWSER IN VIRTUAL MACHINE

(71) Applicant: Stratus Silver Lining, Inc., Sarasota, FL (US)

(72) Inventors: Suman Banerjee, Sarasota, FL (US); Alok Sharma, Madison, WI (US); Arjang Ghassem Zedeh, High Wycombe (GB)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 273 days.

(21) Appl. No.: 15/961,615

(22) Filed: Apr. 24, 2018

(65) Prior Publication Data

US 2018/0307508 A1    Oct. 25, 2018

Related U.S. Application Data

(60) Provisional application No. 62/488,970, filed on Apr. 24, 2017.

(51) Int. Cl.
*G06F 9/451* (2018.01)
*G06F 9/455* (2018.01)

(52) U.S. Cl.
CPC .......... *G06F 9/452* (2018.02); *G06F 9/45533* (2013.01); *G06F 2009/45591* (2013.01); *G06F 2009/45595* (2013.01)

(58) Field of Classification Search
CPC ................. G06F 9/452; G06F 9/45533; G06F 2009/45595; G06F 2009/45591
See application file for complete search history.

(56) References Cited

U.S. PATENT DOCUMENTS

2014/0040883 A1* 2/2014 Tompkins ............. G06F 9/5072
                                                    718/1
2015/0187092 A1* 7/2015 Jezabek .................... G06T 9/00
                                                    382/239

\* cited by examiner

*Primary Examiner* — Soe Hlaing

(57) ABSTRACT

A method includes establishing a remote desktop connection between a first computing device and a first virtual machine executed by a second computing device. A stream of data generated by a first application executing on the first virtual machine is received in the first computing device over the remote desktop connection. A user interactivity metric associated with a user's interaction with the first application via the first computing device is determined. A compression metric is generated based on the user interactivity metric. The stream of data is compressed based on the compression metric.

20 Claims, 3 Drawing Sheets

IMPLEMENTING WEB BROWSER IN VIRTUAL MACHINE

BACKGROUND

Field of the Disclosure

The present disclosure relates generally to computing systems, and more particularly, to implementing a web browser in a virtual machine.

Description of the Related Art

Most end-user computing systems allow users to browse content available at various websites using popular applications, referred to as browsers. Today's browsers are very complex software with millions of lines of code. As a result, running a modern browser, even on a high performance PC, is often not a high-performance experience from the user's standpoint. Similarly, the web content that is displayed through such browsers is becoming very complex. Many web sites are highly graphical, rich in audiovisual elements, and incorporate many active and web-server interactive elements. Moreover, many websites are organized in a manner where the content for the website is obtained by the browser in a largely sequential order, thereby resulting in a significant delay associated with retrieving all of the content prior to rendering the webpage for the user. Consequently, on a low bandwidth link the web browser performance appears to be very low even if the user's computer or device has high computational, memory, and storage capabilities.

Given that browsers have a large code base, it is possible that the browser software itself may be prone to performance problems, such a memory leaks, instability. etc. Adding this to the modern complexity of the web content results in browsers that are frequently unstable and can rapidly slow down the user's computer or device and, hence, the browsing experience.

Further, the responsiveness of a browser in rendering web content is also dependent on various third-party services associated with the Internet, for example, the Domain Name Service (DNS) that is responsible for resolving the names of various domains referenced in the webpages. Sometimes access to DNS is slow from an end user device or computer due to network latencies associated with the user's location.

BRIEF DESCRIPTION OF THE DRAWINGS

The present disclosure may be better understood, and its numerous features and advantages made apparent to those skilled in the art, by referencing the accompanying drawings. The use of the same reference symbols in different drawings indicates similar or identical items.

DETAILED DESCRIPTION

FIGS. 1-4 illustrate a cloud based virtual computing system for implementing web browsing in a virtual machine. In the illustrated examples, virtual machines may be implemented using a cloud based virtualization system, where users can access web browsing applications, and possible other advanced applications, on virtual machines in the cloud using a remote terminal application. The user may interact with a browser application and/or an advanced application as if a local advanced workstation were being used, but the advanced processing requirements may be handled by the virtualization system, and the user may be isolated from the browser application, enhancing performance and security. The stream between the virtual machine implementing the browser application and the user workstation may be dynamically compressed based on user interactivity.

Figure 1:
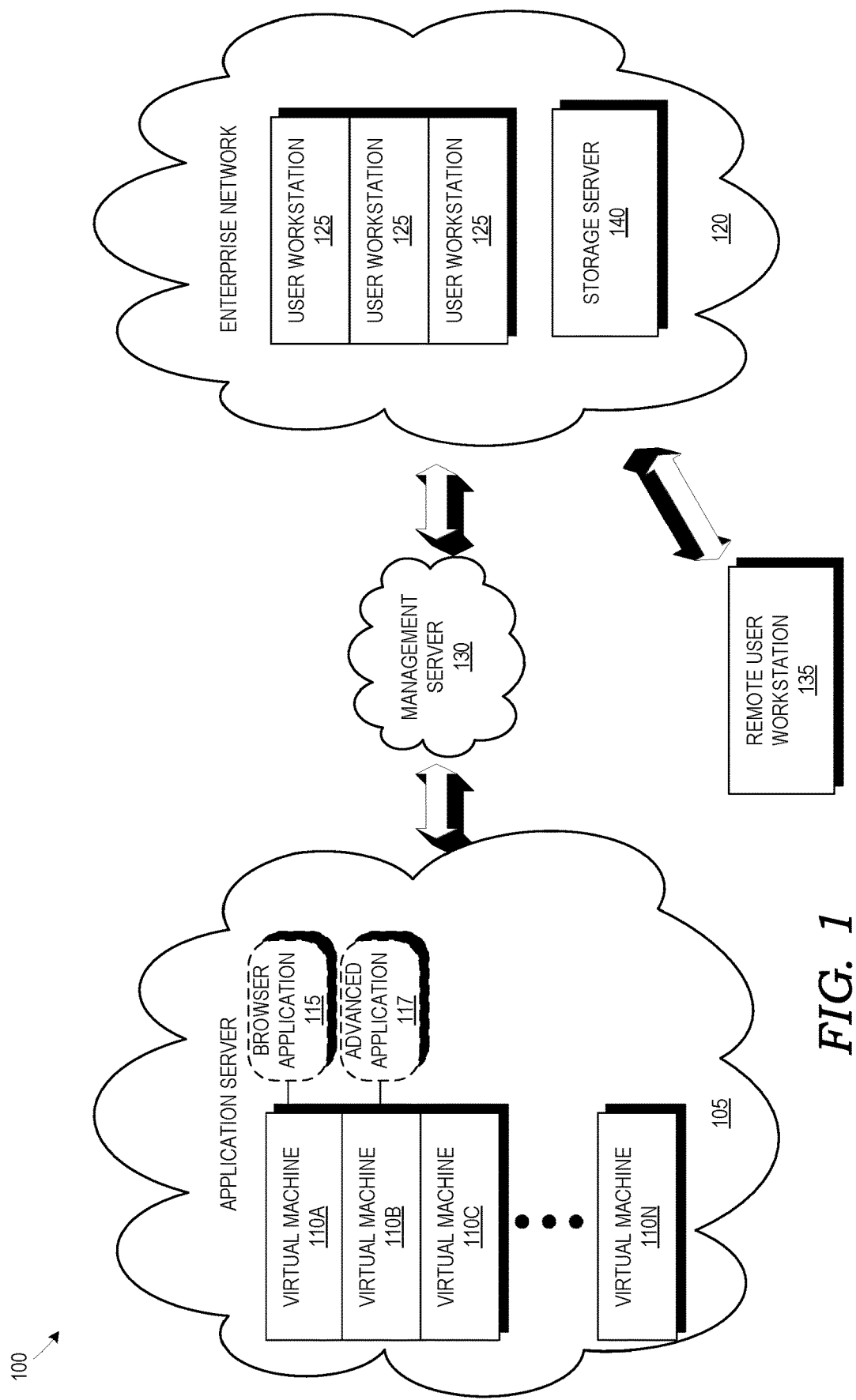
FIG. 1 is a simplified block diagram of a cloud based virtual computing system in accordance with some embodiments.

FIG. 1 is a simplified block diagram of a cloud based virtual computing system 100 in accordance with some embodiments. The system 100 includes an application server 105 operable to support the virtualization of a plurality of virtual machines 110A-110N. As known to those of ordinary skill in the art, machine virtualization involves dividing the computing resources of a physical processing unit or units into multiple virtual machines 110A-110N, each with its own operating system, software applications, virtual processor, memory, peripheral devices, etc. The virtualization resource allocates physical computing resources from a pool of computing systems, such as severs, to meet the processing demands of the individual virtual machines 110A-110N. Commercial application servers 105 that enable the use of virtual machines are AZURE® by MICROSOFT® and Amazon Web Services (AWS) by AMAZON®. Such a setup of one or more virtual machines 110A-110N may be referred to as a "Desktop-in-the-Cloud" or (DitC).

In general, one or more of the virtual machines, such as the virtual machine 110A, is employed to implement a browser application 115 and, in some embodiments, a different virtual machine 110B may be employed to implement an advanced application 117. The advanced application 117 is intended to represent a particular software application that has relatively high processing requirements, such that it would typically require the use of a relatively high powered computing system for its execution. For example, one such application is MATLAB®. However, the application of the subject matter disclosed herein is not limited to a particular software application.

The system 100 may also include an enterprise network 120 including a plurality of user workstations 125. In the illustrated embodiment, the user workstations 125 act as terminals for interacting with the virtual machines 110A-110N to allow operation of web browsers 115 and the advanced applications 117. The use of the virtual machines 110A-110M reduces the constraints on the processing power required for the user workstations 125 and also isolates the user workstations 125 from the browser application 115 or the advanced application 117 to provide enhanced security. The use of multiple virtual machines 110A, 110B also provides isolation between the browser application 115 and the advanced application 117.

A management server 130 interfaces between the user workstations 125 and the virtual machines 110A-110N. Communications may take place through the Internet using a remote terminal protocol, such as a remote desktop protocol (RDP). In some embodiments, the enterprise network 120 may support remote user workstations 135 that connect to the enterprise network 120 via secure protocols, such as virtual private network (VPN) connections, and subsequently connect through the enterprise network 120 and the management server 130 to one of the virtual machines 110. In this manner, users may be centrally located at a facility within the enterprise network 120 or they may be dispersed geographically. Such an arrangement supports distance learning for an educational institution or telecommuting for a business. In some embodiments, the enterprise network 120 may not be present, and the user workstation 135 may connect directly to the virtual machines 110A-110N using an RDP protocol.

The enterprise network 120 may also include a storage server 140 for storing user data, such as data files, or report files associated with the advanced application 115. In some embodiments, the workstations 125, 135 may have local storage (e.g., drives) for storing the data in conjunction with or in lieu of the storage server 140. The term local storage, as used herein is intended to imply local to the enterprise network 120 or the terminals 125, 135, as compared to any remote storage provided by the application server 105.

To provide enhanced privacy for the code and data, the system 100 is configured to provide a virtual tunnel between the enterprise network 120 and the application server 105 and the user's virtual machine 110, as described below.

Figure 2:
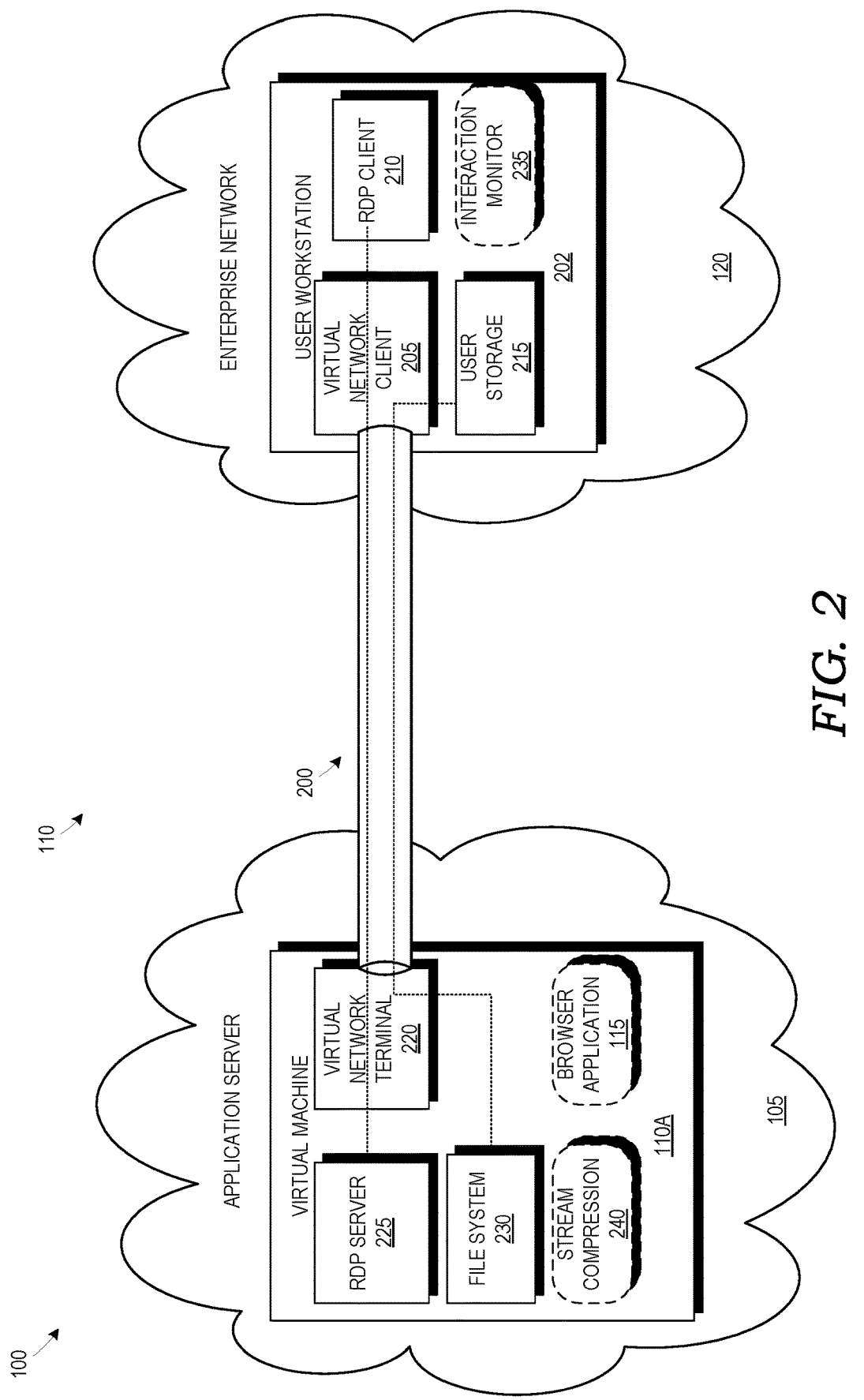
FIG. 2 is a simplified block diagram illustrating an arrangement for providing local drive mapping flexibility in accordance with some embodiments.

FIG. 2 is a simplified block diagram illustrating a virtual network tunnel 200 in accordance with some embodiments. A user workstation 202 (e.g., the user workstation 125 or the remote user workstation 135 in FIG. 1) implements a virtual network client 205, an RDP client 210, and user storage 215. The user storage 215 may be local to the user workstation 202 or local to the enterprise network 120. The virtual machine 110A implements the browser application 115, a virtual network terminal 220, a RDP server 225, and file system 230.

Within the context of FIG. 1, the virtual network client 205 and the virtual network terminal 220 may be instantiated by the management server 130. The virtual network client 205 and the virtual network terminal 220 handle communication between the RDP client 210 and the RDP server 225. The virtual network client 205 and the virtual network terminal 220 allow the communication to occur across multiple domains, sub-domains, firewalls, etc. In many instances, networks may block certain types of traffic for security reasons, including but not limited to the common port allocated for RDP communication. The virtual network client 205 and the virtual network terminal 220 employ an HTTP protocol that is not impacted by various firewall restrictions. Since the traffic between the client terminal 205 and the virtual network terminal 220 appears as regular web traffic, it is not filtered. The virtual network client 205 and the virtual network terminal 220 encrypt and encapsulate the RDP traffic into data blocks (e.g., HTTP packets) that employ common HTTP message formats. In some embodiments, the virtual network client 205 and the virtual network terminal 220 may exchange periodic messages to verify that both sides of the virtual network tunnel 200 remain operable. This exchange allows the virtual network terminal 220 to send asynchronous traffic to the virtual network client 205, which might otherwise be blocked based on conventional network traffic rules.

In one embodiment, the virtual network terminal 220 and the virtual network client 205 maintain a TCP connection. When a remote desktop message (e.g., command) is generated by the RDP client 210, the virtual network client 205 receives the remote desktop message and converts it to a transport message using a different transport protocol. For example, the RDP message may be encoded using an ASCII coding (e.g., "AxrEbG543c2"). The length of the message may vary depending on the information being sent by the RDP client 210. Then, the virtual network client 205 sends a transport message in the format of an HTTP GET request to the virtual network terminal 220 (e.g., GET XXXX.net/encoded-packet/vY.Y/AxrEbG543c2), where XXXX.net is the address of the virtual network terminal 220, and Y.Y specifies the protocol version. In response, the virtual network terminal 220 receives the transport message, extracts and decodes the remote desktop message and forwards the extracted RDP message to the RDP server 225. The RDP server 225 may send a reply, which is intercepted by the virtual network terminal 220 and converted into another HTTP message (i.e., transport message), such as:

```
HTTP/1.1 200 OK
Date: Fri, 31 Dec 2016 23:59:59 GMT
Content-Type: image/gif
Content-Length: 1354
<DATA>
```

DATA refers to the RDP message from the RDP server 225 that was encoded. This arrangement provides that the exchanged data in the format of transport messages is treated like other HTTP traffic in the Internet and passes through the enterprise network 120 and its firewalls. In some embodiments, the transport message may encrypt the underlying RDP message.

Although the virtual network terminal 220 is illustrated as operating on the same virtual machine 110A as the RDP server 225, in some embodiments, it may be executed on a different virtual machine 110A-110N. A single virtual network terminal 220 may facilitate communication with multiple virtual machines 110A-110N and the users at the associated virtual network clients 205.

The application server 105 has a high bandwidth link, especially with various content providers in the Internet. Instead of running the browser application 115 in the end user device or computer 202, the browser application 115 is run in the virtual machine 110A. The RDP client 210 provides the screen of the virtual machine 110A available on the user workstation 202. In this approach, the browser application 115 runs efficiently in the application server 105, which is much better provisioned in terms of computing capability, memory, and storage, compared to user workstation 202. The rendered visual content that is displayed in the browser application 115 is available through the RDP client 210 in the user workstation 202, much like a media stream that displays the output of the browser application 115 on the virtual machine 110A onto the user workstation 202.

Instantiating the browser application 115 in the virtual machine 110A allows the delivery of a higher performance browsing experience, even over a relatively low bandwidth connection between the user workstation 202 and the application server 105 via the virtual network tunnel 200. The virtual machine 110A implementing the browser application 115 operates in a high performance environment including increased execution speed and a low latency, high bandwidth connection with other resources on the Internet. Hence, the responsiveness of the browser application 115 in fetching content is enhanced. The interactions between the browser application 115 and the DNS service is also enhanced by the high bandwidth, low latency link, thereby increasing the DNS server performance. In some embodiments, the application server 105 and the DNS server may be located in close proximity. Since the output of the browser application 115 sent to the user workstation 202 is essentially a video stream, a low bandwidth connection may be used, and the requirements may also be tailored to the screen size of the user workstation 202.

Figure 3:
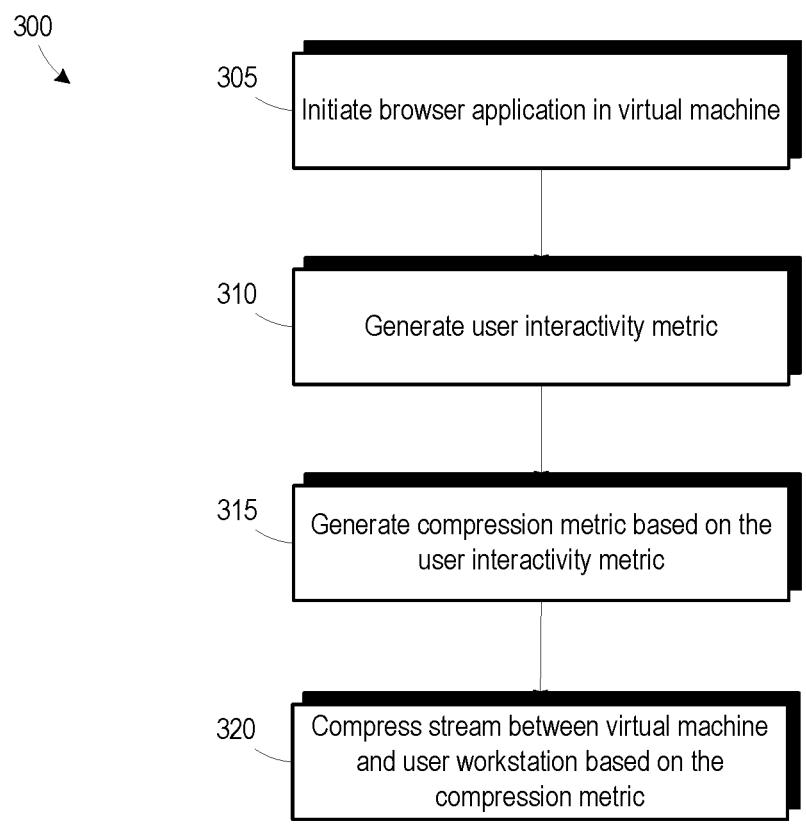
FIG. 3 is a flow diagram of a method for dynamically compressing a stream between a virtual machine and a user workstation based on user interactivity, in accordance with some embodiments.

FIG. 3 is a flow diagram of a method 300 for dynamically compressing a stream between a virtual machine and a user workstation based on user interactivity, in accordance with some embodiments. In method block 305, the browser application 115 is initiated in the virtual machine 110A. A dynamic video compression technique may be implemented by the RDP server 225 and the RDP client 210 for communicating the video stream over the virtual network tunnel 200. In general, the higher the amount of compression applied (e.g. by choosing a group of pictures (GOP) stream of greater length), the higher the perceived delay of an interactively refreshed screen. The user workstation 202 implements an interactivity monitor 235 that cooperates with the RDP client 210, and the virtual machine 110A implements a stream compression unit 240 that cooperates with the RDP server 225 to facilitate the method 300. Although illustrated as separate entities, the stream compression unit 240 may be integrated with the RDP server 225, and the interactivity monitor 235 may be integrated with the RDP client 210.

The interactivity monitor 235 monitors the user's interaction with the browser application 115 via the RDP client 210 and generates a user interactivity metric in method block 310. User clicks, keystrokes, mouse movements, etc. are indications of user interactivity. A relatively high level of user interactivity indicates that the user is actively engaged with the browser application 115, and lag should be minimized by reducing the compression. Conversely, a relatively low level of interactivity indicates the user is likely just viewing the output of the browser application 115, and the compression may be increased.

The interactivity monitor 235 provides the user interactivity metric to the RDP client 210 indicative of the user's degree of interactivity. The user interactivity metric may have discrete grades, such as low, medium, high, or it may have a numerical range (e.g., zero to one, where zero indicates low interactivity, and 1 indicates high interactivity). The RDP client 210 communicates the interactivity metric to the RDP server 225. In method block 315, the stream compression unit 240 generates a compression metric for modulating the degree of compression (e.g., GOP stream length, bit rate, frame rate) based on the user interactivity metric. In method block 320, the stream compression unit 240 compresses a stream between the virtual machine 110A and the user workstation 202 based on the compression metric. By modulating the degree of compression, the stream may be managed without negatively affecting the user experience. For example, when a user is performing a text input on the browser application 115, the responsiveness required is high so that the user can see the interactions without lag. Hence, the compression level would be decreased by the RDP server 225. On the other hand, when the user is not typing on the browser application 115 or otherwise doing something interactive, the compression level may be increased by the RDP server 225 to reduce the required throughput for transmitting the screen content from the browser application 115 to the user workstation 202. The interactivity monitor 235 can continuously monitor user interactivity, and the stream compression unit 240 can dynamically adjust the compression level based on the user interactivity to support the user experience while conserving resources. In some embodiments, rather than the stream compression unit 240 determining the level of compression based on the interactivity metric, the interactivity monitor 235 may determine the level of interactivity, generate a compression metric based on the interactivity level, and communicate the compression metric to the stream compression unit 240 via the RDP client 210 and the RDP server 225. The stream compression unit 240 simply implements the specified level of compression.

If the screen size of the user workstation 202 is relatively small (e.g., notebook or tablet device), additional performance improvements may be implemented. By using an adaptive bit rate encoding for the video stream, the compression and bandwidth delivered can be optimized to fit the available bandwidth and screen requirements while at the same time increasing responsiveness. The stream compression unit 240 may detect the type of content being streamed (e.g., video, graphics, virtual reality, etc.) and employ an adaptive frame rate to increase or reduce the rate at which these frames are being streamed, so as to fit within the bandwidth and requirements of the content to support the user experience. Further, by combining the adaptive bit rate and adaptive frame rate approaches and linking them to actual content type, the user experience can be enhanced. For example, in the case of a video stream being displayed in the browser application 115, a higher frame rate can be utilized along with use of a lower bandwidth using adaptive bit rate encoding.

In addition, in an embodiment where multiple user workstations 202 are present in a location (e.g., the enterprise network 120) and employing a shared low bandwidth link, the adaptive bit rates and frame rates may be optimized over the plurality of user workstations 202 to support the user experience for all of these workstations 202.

The browser application 115 may be equipped with ad blocker technology that prevents advertisements from being displayed or played in the browser application 115. The operator of the management server 130 (i.e., the entity offering the browser virtualization) can decide on a case-by-case basis to provide a white list of certain ads that are allowed to be displayed. In one embodiment, this centralized white list management for the browser applications 115 may be implemented in the cloud. This arrangement may facilitate advertisers dynamically bidding in real time for access to allow their ads to be displayed on the cloud-hosted browser applications 115 in a targeted fashion on a per user basis based on user characteristics.

Further, the virtualization of the browser application 115 allows opportunities for improved security and safety from malware. In particular, the browser application 115 on the virtual machine 110A can implement malware prevention methods as part of its associated software components, thereby limiting their impact on the user workstation 202. Typically, such malware scanning can slow down the user workstation 202 and introduce additional lag. Since all of the browser-side software components, such as HTML5, JavaScript, and other code components, only operate inside the virtual machine 110A, any malware or virus that might exist in such software components do not affect the user workstation 202.

The DitC desktop represented by the virtual machines 110A, 110B may be rendered on the user workstation 202, effectively providing basic input facility (e.g., mouse, keyboard, and touch functionalities) and basic output facility (e.g., screen display, audio speakers, etc.). A user may start by opening the advanced application 117 (e.g., Matlab, AutoCAD, Adobe, etc.) or some other application on the virtual machine 110B. The virtual machine 110B may thus represent a DitC desktop. When a user opens a browser application 115 in the DitC, the browser application 115 may be executed on a different virtual machine 110A in a seamless manner form the perspective of the user. Malicious code, such as viruses, malware, etc., from the browser application 115 cannot affect the DitC desktop or its associated virtual machine 110B.

In some embodiments, the DitC virtual machine 110B and the browser virtual machine 110A may share the same physical application server 105. The browser application 115 on the virtual machine 110A might consume too much compute, memory, or storage resources in the application server 105, thereby limiting the performance of the DitC virtual machine 110B. To mitigate this scenario, the application server 105 may implement a DitC management module (e.g., in software) to constrain the total amount of computing, memory, and storage resources allocated to the virtual machine 110A implementing the browser application 115. If during the operation of the browser application 115, the virtual machine 110A experiences performance issues, either due to a malware, virus, or other such reasons, the DitC management module provides an interface through which the end user or some automated software component can terminate the isolated virtual machine and flag observed problems for future analytics. When the end user completes interaction with the browser application 115, the virtual machine 110A in application server 105 is automatically terminated, returning control to the DitC virtual machine 110B.

A method includes establishing a remote desktop connection between a first computing device and a first virtual machine executed by a second computing device, receiving a stream of data generated by a first application executing on the first virtual machine in the first computing device over the remote desktop connection, determining a user interactivity metric associated with a user's interaction with the first application via the first computing device, and generating a compression metric based on the user interactivity metric, wherein the stream of data is compressed based on the compression metric.

A method includes establishing a plurality of remote desktop connections between user workstations and a plurality of virtual machines executed by an application server remote from the user workstations, receiving streams of data generated by applications executing on the virtual machine in the user workstations, determining a user interactivity metric associated with a user's interaction with each of the virtual machines via the associated user workstation, and generating a compression metric for each of the user workstations based on the associated user interactivity metric, wherein the stream of data for the associated virtual machine is compressed based on the compression metric.

A system includes a first computing device to execute a first application on a virtual machine, and a user workstation. The user workstation is to communicate with the first virtual machine using a remote desktop connection, receive a stream of data generated by the first application over the remote desktop connection, and determine a user interactivity metric associated with a user's interaction with the first application via the first computing device, wherein the stream of data is compressed based on a compression metric generated based on the user interactivity metric.

In some embodiments, certain aspects of the techniques described herein may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM), or other non-volatile memory devices, and the like. The executable instructions stored on the non-transitory computer readable storage medium may be in source code, assembly language code, object code, or other instruction format that is interpreted or otherwise executable by one or more processors.

A non-transitory computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   establishing a remote desktop connection between a first computing device and a first virtual machine executed by a second computing device;
   receiving a stream of data generated by a first application executing on the first virtual machine in the first computing device over the remote desktop connection;
   determining a user interactivity metric associated with a user's interaction with the first application via the first computing device; and
   generating a compression metric based on the user interactivity metric, wherein the stream of data is compressed based on the compression metric.

2. The method of claim 1, further comprising communicating the user interactivity metric to the first virtual machine.

3. The method of claim 1, further comprising:
   generating the compression metric in the first computing device; and
   communicating the compression metric to the first virtual machine.

4. The method of claim 1, wherein the compression metric specifies a frame rate.

5. The method of claim 1, wherein the compression metric specifies a bit rate.

6. The method of claim 1, further comprising generating the compression metric based on the user interactivity metric and a content type associated with the first application.

7. The method of claim 1, wherein the first application comprises a browser application.

8. The method of claim 1, further comprising:
   instantiating a second application on a second virtual machine executed by the second computing device, wherein the second virtual machine is distinct from the first virtual machine; and
   receiving a second stream of data generated by the second application over the remote desktop connection.

9. A method, comprising:
   establishing a plurality of remote desktop connections between user workstations and a plurality of virtual machines executed by an application server remote from the user workstations;
   receiving streams of data generated by applications executing on the plurality of virtual machines in the user workstations;
   determining a user interactivity metric associated with a user's interaction with each of the plurality of virtual machines via the user workstation associated with the virtual machine; and
   generating a compression metric for each of the user workstations based on the associated user interactivity metric, wherein the stream of data for the associated virtual machine is compressed based on the compression metric.

10. The method of claim 9, further comprising generating the compression metric based on the user interactivity metrics and an overall throughput required to support the plurality of remote desktop connections.

11. The method of claim 9, further comprising communicating the user interactivity metrics to the plurality of virtual machines.

12. The method of claim 9, further comprising:
    generating the compression metric in the user workstation; and
    communicating the compression metric to the virtual machine associated with the user workstation.

13. The method of claim 9, wherein the compression metric specifies a frame rate.

14. The method of claim 9, wherein the compression metric specifies a bit rate.

15. The method of claim 9, further comprising generating the compression metrics based on the user interactivity metrics and a content type associated with the associated application.

16. The method of claim 9, wherein the applications comprise browser applications.

17. A system, comprising:
    a first computing device to execute a first application on a first virtual machine; and
    a user workstation to communicate with the first virtual machine using a remote desktop connection, receive a stream of data generated by the first application over the remote desktop connection, and determine a user interactivity metric associated with a user's interaction with the first application via the first computing device, wherein the stream of data is compressed based on a compression metric generated based on the user interactivity metric.

18. The system of claim 17, wherein the user workstation is to communicate the user interactivity metric to the first virtual machine.

19. The system of claim 17, wherein the user workstation is to generate the compression metric and communicate the compression metric to the first virtual machine.

20. The system of claim 17, wherein the compression metric is generated based on the user interactivity metric and a content type associated with the first application.

* * * * *